United States Patent
Saunders et al.

(10) Patent No.: US 11,783,836 B2
(45) Date of Patent: Oct. 10, 2023

(54) PERSONAL ELECTRONIC CAPTIONING BASED ON A PARTICIPANT USER'S DIFFICULTY IN UNDERSTANDING A SPEAKER

(71) Applicant: International Business Machines Corporation, Armonk, NY (US)

(72) Inventors: Heather Saunders, Raleigh, NC (US); Dana L. Price, Surf City, NC (US); Kelly Camus, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 16/948,769

(22) Filed: Sep. 30, 2020

(65) Prior Publication Data

US 2022/0101857 A1    Mar. 31, 2022

(51) Int. Cl.
    *G10L 15/26*    (2006.01)
    *G10L 21/10*    (2013.01)

(52) U.S. Cl.
    CPC .............. *G10L 15/26* (2013.01); *G10L 21/10* (2013.01)

(58) Field of Classification Search
    None
    See application file for complete search history.

(56) References Cited

U.S. PATENT DOCUMENTS

| | | | |
|---|---|---|---|
| 7,830,408 B2 | 11/2010 | Asthana et al. | |
| 8,983,836 B2 | 3/2015 | Woodward et al. | |
| 9,967,631 B2 | 5/2018 | D'Amelio et al. | |
| 10,224,057 B1 * | 3/2019 | Chevrier | G10L 21/18 |
| 10,255,907 B2 | 4/2019 | Nallasamy | |
| 11,003,839 B1 * | 5/2021 | Hatch | G06F 3/04886 |
| 11,620,566 B1 * | 4/2023 | Shevchenko | G06N 20/00 |
| | | | 706/12 |
| 2010/0145710 A1 * | 6/2010 | Tremblay | G10L 15/1815 |
| | | | 704/275 |
| 2010/0299131 A1 * | 11/2010 | Lanham | G06V 20/40 |
| | | | 704/235 |
| 2016/0360034 A1 * | 12/2016 | Engelke | H04M 3/42161 |

(Continued)

OTHER PUBLICATIONS

"What did the speaker say? Button", An IP.com Prior Art Database Technical Disclosure, Disclosed Anonymously, IP.com No. IPCOM000245505D, IP.com Electronic Publication Date: Mar. 13, 2016, 3 pages.

(Continued)

*Primary Examiner* — Neeraj Sharma
(74) *Attorney, Agent, or Firm* — Michael A. Petrocelli

(57) ABSTRACT

Providing, using a computer, personalized captioning in response to a user having difficulty in understanding another participant speaking. Detecting, at a computer, the user having difficulty in understanding another participant speaking, or alternatively, receiving, at the computer, a communication from a user indicating that the user requests assistance to understand speech of a particular participant in an electronic group meeting. The speech of the particular participant is identified, and a speech input is captured from the particular participant in the electronic group meeting. The captured speech of the particular participant is transcribed, and an audio assistance output is generated for communication to the user. The audio assistance output is communicated to a device of the user.

21 Claims, 9 Drawing Sheets

(56) References Cited

U.S. PATENT DOCUMENTS

| | | | | |
|---|---|---|---|---|
| 2018/0184045 A1* | 6/2018 | Chiang | ............... | G10L 15/26 |
| 2018/0285059 A1* | 10/2018 | Zurek | ............... | G06F 40/35 |
| 2019/0378533 A1* | 12/2019 | Chao | ............... | G10L 17/02 |
| 2020/0366789 A1* | 11/2020 | Patron | ............... | H04M 3/42382 |
| 2021/0056950 A1* | 2/2021 | Niehaus | ............... | G10L 13/00 |
| 2021/0295826 A1* | 9/2021 | Morabia | ............... | H04L 51/046 |
| 2021/0375288 A1* | 12/2021 | Thomson | ............... | G10L 21/10 |

OTHER PUBLICATIONS

Mell et al., "The NIST Definition of Cloud Computing", National Institute of Standards and Technology, Special Publication 800-145, Sep. 2011, 7 pages.

Wiggers, Kyle, "These companies are shrinking the voice recognition 'accent gap'", VentureBeat, Aug. 11, 2018, 6 pages, <https://venturebeat.com/2018/08/11/using-ai-and-big-data-to-address-the-accent-gap-in-voice-recognition-systems/>.

Wilson, Mark, "Google just added closed captioning to everything on your phone", FastCompany, May 7, 19, 5 pages, khttps://www.fastcompany.com/90344669/google just-added-closed-captioning-to-everything-on-your-phone>.

* cited by examiner

PERSONAL ELECTRONIC CAPTIONING BASED ON A PARTICIPANT USER'S DIFFICULTY IN UNDERSTANDING A SPEAKER

BACKGROUND

The present disclosure relates to transcribing and providing captioning or alternative captioning of a speaker in a live or recorded electronic meeting or electronic group meeting.

Electronic entertainment programming and/or a video feed for end user consumption may include an option for closed caption viewing. Closed caption viewing can include transcribed text of the audio in the programming or video feed so that an end user can read the dialog in the programming or video feed. Typically, such closed captioning includes transcribing all speakers in the programming or video feed, and provides text within or superimposed on the programming or video feed for viewing/reading by the end users—timed with respect to the audio. That is, the closed captioning and the audio are synchronized so that the text is provided in concert with the audio so that the end users can read the text as the speaker is verbalizing the audio.

SUMMARY

The present invention provides transcribing and delivery of alternative captioning of a speaker, which can be selected by a user or a participant of an electronic group meeting or automatically selected by a method and system, and the alternative captioning can be initiated by the user or participant of the electronic group meeting or automatically initiated by the method and system.

The present disclosure recognizes the shortcomings and problems associated with current techniques for transcribing and captioning, for example, closed captioning. One problem and shortcoming with current systems can include a lack of a technique to provide captioning, such as closed captioning text, to a user to receive irrespective of a video feed or display, and/or without superimposing captioning on a video feed. In this example, a video feed may not be available nor electronic programming that provides a video feed that can support closed captioning. Additionally, there is lack of a technique in current systems for providing a real time captioning of a particular participant, that is instead of providing synchronized transcribed text of all audio, only providing synchronized text of audio of a particular participant. And additionally, there is a lack of a technique in current systems for providing real-time, synchronized text or alternative audio output for the speech a participant or specified participants(s). It is understood that a participant may also be a user, and vice versa, as used herein.

The present invention provides a technique for detecting when a user is having difficulty understanding another participant's speech, which can be due to an accent, or speaking rapidly, or an issue on the part of the user and/or a combination of issues, and then transcribing the audio of a particular person/participant in a group meeting, and sending it to the user via their preferred delivery method (such as a text message or instant message, etc., or as a real-time feed to a user device), thereby facilitating the user's ability to understand the participant's speech.

In an aspect according to the present invention, a computer-implemented method for personalizing captioning in response to detecting a user's difficulty in understanding another participant speaking in a live or recorded electronic meeting includes detecting, using a computer, a user having a difficulty in understanding speech of a particular participant. The method includes identifying, using the computer, the speech of the particular participant, in response to detecting the user having the difficulty in understanding the speech, and capturing, using the computer, a speech input from the particular participant. The method includes transcribing the captured speech of the particular participant, and generating an audio assistance output for communication to the user. Further, the method includes communicating the audio assistance output to a device of the user.

In a related aspect, wherein the audio assistance output incudes displaying captioning of the speech input on a screen of the device, and the captioning includes speech to text conversion.

In a related aspect, the captioning is displayed on a screen of the device.

In a related aspect, the captioning is displayed on a second screen of a second device communicating with the device.

In a related aspect, the communicating of the audio assistance output includes audio of the speech input for playing using a speaker.

In a related aspect, the detecting of the user having difficulty can include detecting an indicator of the user having the difficulty, and in response to detecting the indicator, initiating the identification of the speech of the particular participant.

In a related aspect, the detecting of the user having difficulty can include detecting an indicator of the user having the difficulty, and in response to detecting the indicator, initiating the identification of the speech of the particular participant; and the method further comprising: detecting an action by the user, at least in part, as the indicator.

In a related aspect, the action by the user can include a request for a particular participant to repeat or explain previously recited speech.

In a related aspect the detecting of the user having difficulty can include detecting an indicator of the user having the difficulty, and in response to detecting the indicator, initiating the identification of the speech of the particular participant; and the indicator including a communication from the user indicating that the user requests assistance.

In a related aspect, the method can include determining a match for a previously stored speech profile for the particular participant or creating a speech profile when the previously stored speech profile does not exist.

In a related aspect, the method can further include identifying the particular participant based on the speech of the particular participant.

In a related aspect, the method can further include identifying the user based on the received communication from the user; and only communicating the audio assistance output to the device of the user.

In a related aspect, the method can include not communicating the audio assistance output to another participant and/or not communicating the audio assistance output as a closed caption in a video stream.

In a related aspect, the method can include receiving a selection, from the user, of a mode of communication of the audio assistance output to the user.

In a related aspect, the method can include determining a similar previously stored speech profile for a first particular participant based on criteria including a language accent; and initiating the audio assistance output in response to the first particular participant having a similar profile to the similar previously stored speech profile.

In a related aspect, the method can include receiving participant data from each of a plurality of participants in the electronic group meeting; generating a participant profile for each of the plurality of participants; analyzing speech of each of the participants or the plurality of participants, the analysis of the speech including analysis of speech patterns; identifying each of the participants based on the speech analysis, respectively; and saving the identification and the speech analysis in the participant profile for each of the plurality of participants.

In a related aspect, the method can include, in response to the user using a mobile phone, sending the audio assistance output being sent to a screen of the mobile phone; in response to the screen of the mobile phone not being available, sending the audio assistance output to another device connected to the mobile phone; and in response to the mobile phone not being available, sending the audio assistance output to another electronic device communicating with the electronic group meeting.

In a related aspect the communication received from the user includes a selection from the user indicating the particular participant that the user requests assistance to understand speech.

In another aspect according to the present invention, a system uses a computer for personalizing captioning in response to detecting a user's difficulty in understanding another participant speaking in a live or recorded electronic meeting, and includes: a computer system comprising; a computer processor, a computer-readable storage medium, and program instructions stored on the computer-readable storage medium being executable by the processor, to cause the computer system to perform the following functions to: detect, using a computer, a user having a difficulty in understanding speech of a particular participant; identify, using the computer, the speech of the particular participant, in response to detecting the user having the difficulty in understanding the speech; capture, using the computer, a speech input from the particular participant; transcribe the captured speech of the particular participant; generate an audio assistance output for communication to the user; and communicate the audio assistance output to a device of the user.

In another aspect according to the present invention, a computer program product for personalizing captioning in response to detecting a user's difficulty in understanding another participant speaking in a live or recorded electronic meeting, includes a computer readable storage medium having program instructions embodied therewith, the program instructions executable by a computer to cause the computer to perform functions, by the computer, comprising the functions to: detect, using a computer, a user having a difficulty in understanding speech of a particular participant; identify, using the computer, the speech of the particular participant, in response to detecting the user having the difficulty in understanding the speech; capture, using the computer, a speech input from the particular participant; transcribe the captured speech of the particular participant; generate an audio assistance output for communication to the user; and communicate the audio assistance output to a device of the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

In one definition, transcription can include a process of converting speech or audio to a written text document. In another definition, captioning can include dividing transcribed text into time-coded pieces or periods, which can be referred to as caption frames. As used herein, a caption or captioning is divided transcribed text synchronized to a video or real-time speaker. The captioning can be presented as transcribed text, for example, closed captioning, and/or as audio, in one example, superimposed over a speaker or audio for a user to more easily understand a speaker with speech more understandable for the user.

Embodiments and Examples

Figure 1:
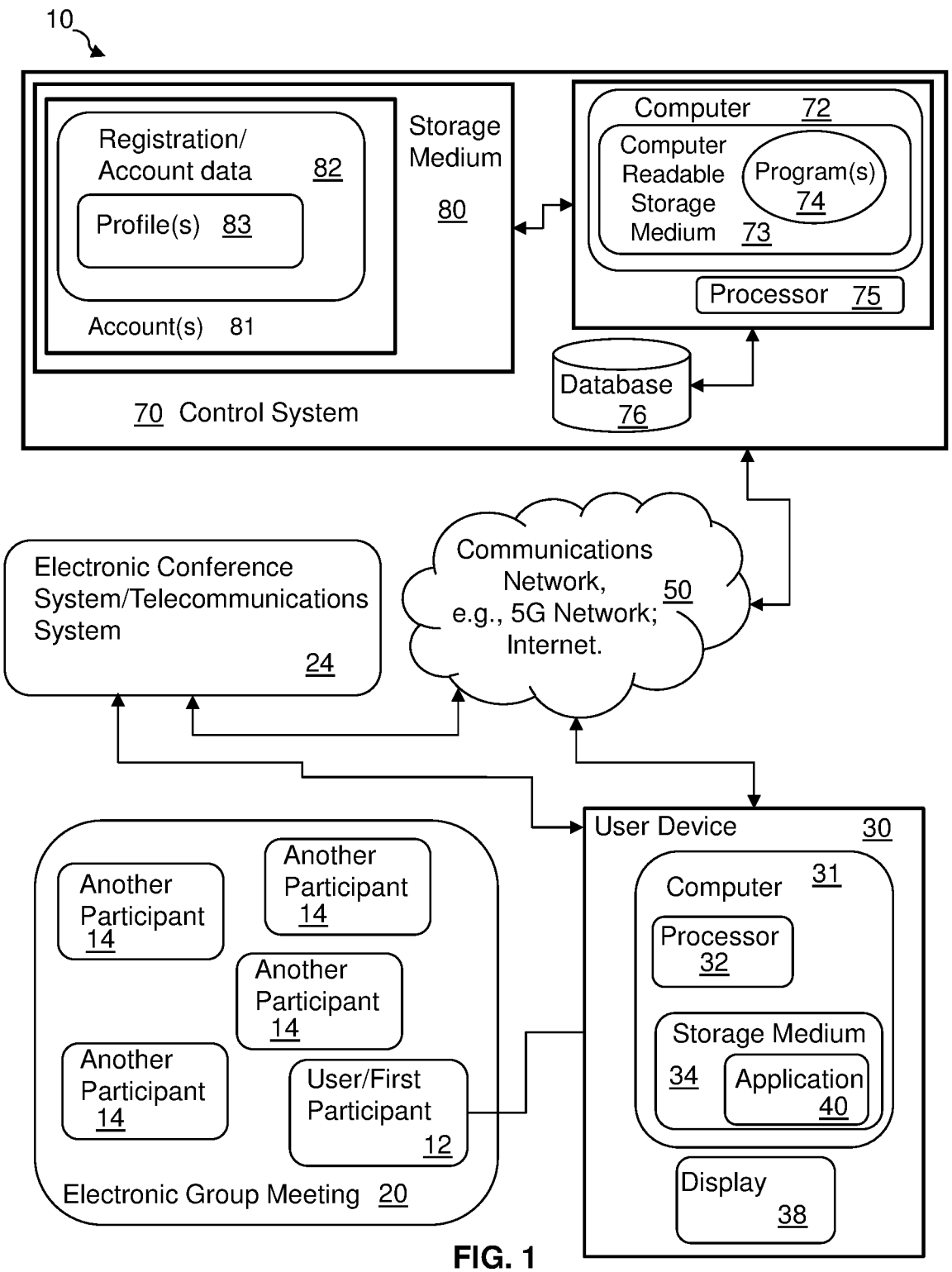
FIG. 1 is a schematic block diagram illustrating an overview of a system, system features or components, and methodology for personalizing captioning in response to a user indicating a difficulty in understanding another participant speaking, according to an embodiment of the present disclosure.
Figure 2:
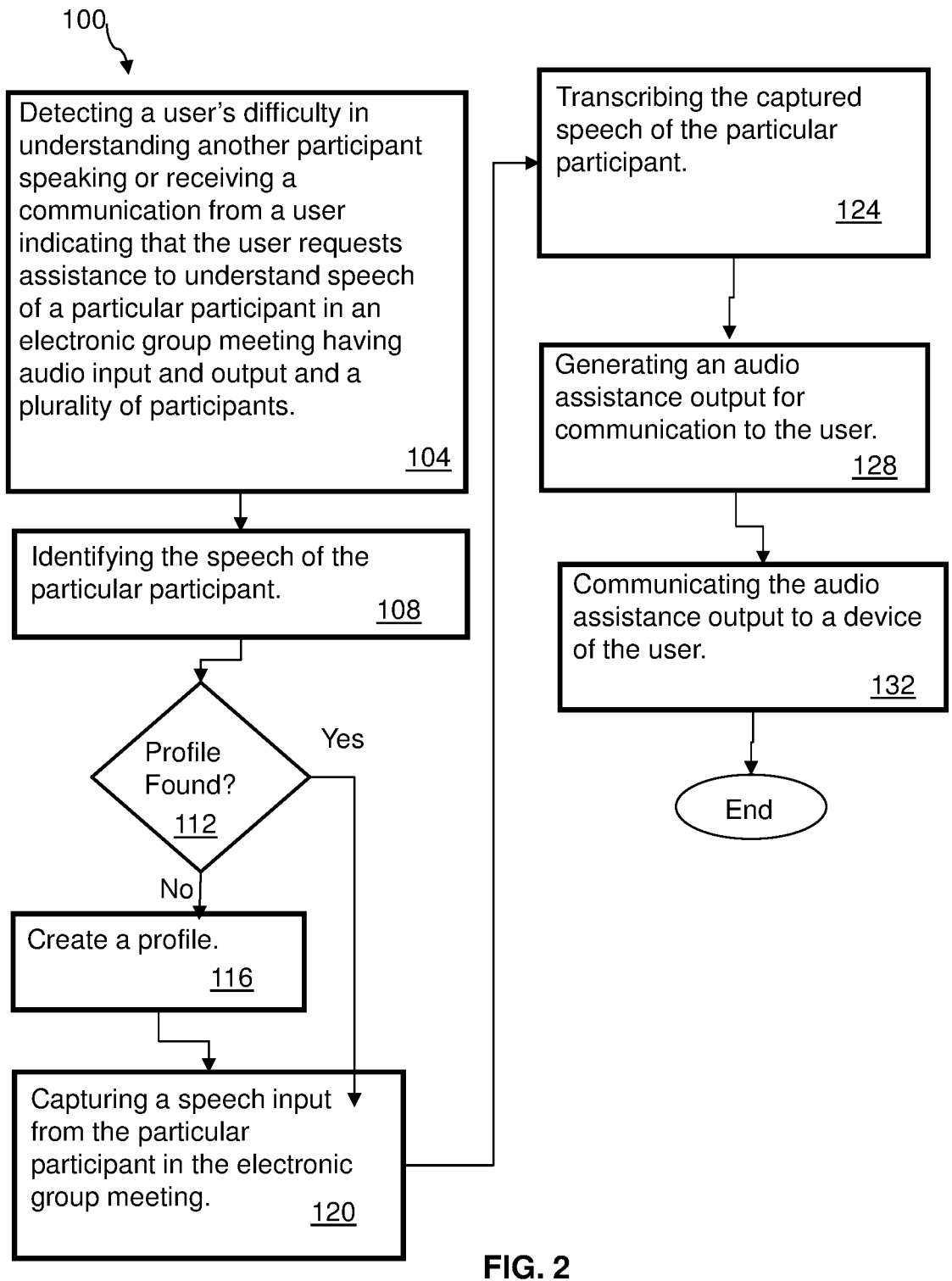
FIG. 2 is a flow chart illustrating a method, implemented using the system shown in FIG. 1, for personalizing captioning in response to a user indicating a difficulty in understanding another participant speaking, according to an embodiment of the present disclosure.
Figure 5:
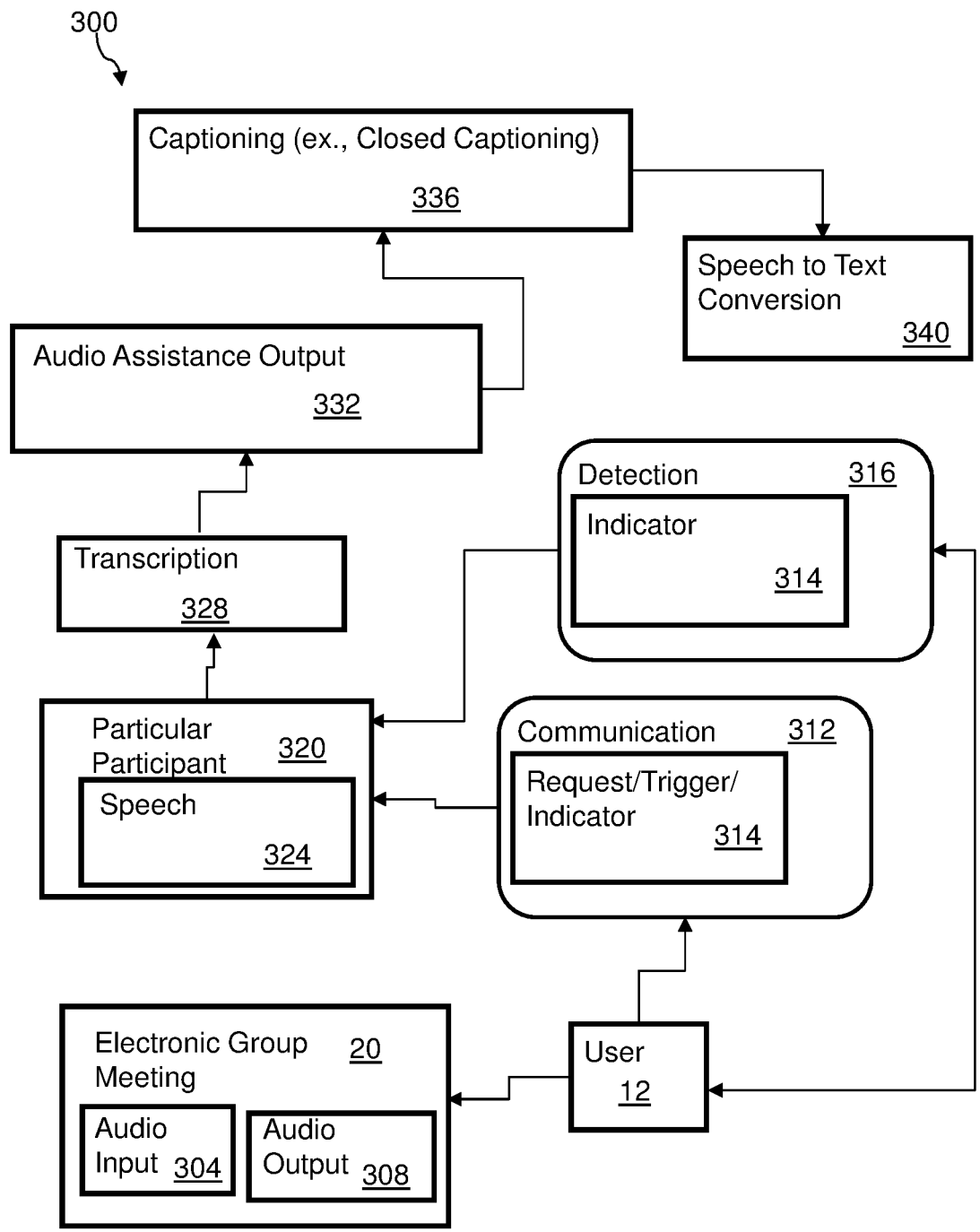
FIG. 5 is a functional schematic block diagram showing a series of operations and functional methodologies, for instructional purposes illustrating functional features of the present disclosure associated with the embodiments shown in the FIGS., for personalizing captioning in response to a user indicating a difficulty in understanding another participant speaking.

Referring to FIGS. 1 and 2, and FIG. 5, a computer-implemented method 100 for personalizing captioning in response to a user having difficulty in understanding another participant's speech includes a series of operational blocks for implementing an embodiment according to the present disclosure. The method 100, in FIG. 2, according to an embodiment of the present disclosure includes detecting a user's difficulty in understanding another participant speaking or receiving a communication 312 from a user 12, as shown in FIG. 5, indicating that the user 12 requests assistance to understand speech 324 of a particular participant 320 in an electronic group meeting 20 having audio input 304 and audio output 308 and a plurality of participants, as in block 104. Each of the plurality of participants is designated as another participant 14, and the user or first participant 12 is also a participant of the plurality of participants. For example, an audio input includes each of the participants speaking, i.e., their speech, in the electronic group meeting. In another example, the audio output includes the speaking of the participants as a group, i.e., the participants speaking in one forum.

In one example, the method and system can detect the user's difficulty in understanding another participant speaking by detecting a communication or request by the user for the participant to repeat or review previously recited speech. For example, the user may request, for instance verbally asking the participant to repeat what they just said. In another example, in a video tape scenario, the user may keep repeating a section of a participant talking, or keep repeating talking from a particular participant, indicating that the user is having trouble with the particular participant's speech. Such repeating of a taped section, or verbal live request for a participant to repeat speech or explain are examples of indicators pointing towards the user having difficulty in understanding another participant's speech.

In another example, the user can communicate a difficulty in understanding a participant's speech. Such communication is an example of indicator which indicates that the user is having difficulty understanding a participant's speech. For instance, the user can initiate an action such as the user selecting a button presenting on a screen connected to a user device or presented on a GUI (Graphical User Interface) interface. In another example of an action by the user, the user can send a communication, such as a text, to the system, as an indicator which indicates that the user is having difficulty understanding a participant's speech.

The user can connect to the electronic group meeting 20 using a device 30, as shown in FIG. 1. The device can include a computer 31 having a processor 32 and computer readable storage medium 34, and a display or monitor 38. An application 40 embodying the method of the present disclosure can be stored on the computer readable storage medium 34. The device 30 further including the processor 32 for executing the application/software. The device 30 can communicate with a communications network 50, e.g., the Internet. The device 30 can also communicate with an electronic conference system/telecommunications system 24 for establishing an electronic group meeting 20.

It is understood that the user device is representative of similar devices for each of the another participants 14, and is shown in FIG. 1 as representative of such devices, which can include mobile devices, smart devices, laptop computers, etc. In one example, the user device could be a phone system and the method and system according to the present disclosure sends a caption to a user device (which will be discussed in more detail below).

The method 100 includes identifying the speech of the particular participant, as in block 108. For example, the system can determine speech identification using speech recognition and assign recognized speech to a participant.

Profiles can be saved for users/participants. The profiles can include previously identified participants and can include data about the speech and speech patterns of participants. Such profiles can supply data for analysis of current speech for a participant, and additional data can be added thus providing a learning mechanism for the analysis of speech.

The method and system can search for a match of the speech for a participant to a participant profile using a participant's name, if available, or using identifying speech patterns.

When a profile is not found at block 112, the method creates a profile at block 116. When a profile is found at block 112, the method proceeds to block 120 which includes capturing a speech input from the particular participant in the electronic group meeting.

In one example, the system of the present disclosure can include a control system 70 communicating with the user device 30 via a communications network 50. The control system can incorporate all or part of an application or software for implementing the method of the present disclosure. The control system can include a computer readable storage medium 80 where account data and/or registration data 82 can be stored. Participant profiles 83 can be part of the account data and stored on the storage medium 80. The control system can include a computer 72 having computer readable storage medium 73 and software programs 74 stored therein. A processor 75 can be used to execute or implement the instructions of the software program. The control system can also include a database 76.

In one example, a user can register or create an account using the control system 70 which can include one or more profiles 83 as part of registration and/or account data 82. The registration can include profiles for each user or participant and include personalized data. For example, users and/or participants can register using a website via their computer and GUI (Graphical User Interface) interface. The registration or account data 82 can include profiles 83 for an account 81 for each user. Such accounts can be stored on the control system 70, which can also use the database 76 for data storage.

In one example, the system and method according to the present disclosure can detect, using historical data for the user, when a user previously had difficulty understanding a participant, and automatically turn-on, provide, or generate audio assistance output for the user by following the operative steps of the present disclosure. In another example, historical data of participants, as provided by the profiles, can be used by the system to assess when a participant, new or previously encountered) has a similar language accent to a participant that the user previously had trouble understanding. In such a situation, the system and method can provide audio assistance as presented herein by capturing that participants speech, transcribing and generating audio assistance for the user.

The method 100 includes transcribing 328 the captured speech of the particular participant, as in block 124. For example, the captured or input audio speech can be transcribed to text. Such text can be an output.

The method 100 includes generating an audio assistance output 332 for communication to the user, as in block 128. And, the method includes communicating the audio assistance output 332 to a device 30 of the user 12, as in block 132. For example, the audio assistance output can include captioning. Captioning can include closed captioning to a device of the user for display on a screen or monitor of the device. In another example, the audio assistance output can include captioning to a second device of the user, for example, a user can be participating in a group meeting using a computer, and the audio assistance output can be communicated to a smart device, such as a mobile phone. In another example, the audio assistance output can include an audio output sent to a user's smart device or headphones.

In one example, the audio assistance output 332 (shown in FIG. 5) includes displaying captioning of the speech input on a display 38 of the device 30, and the captioning 336 includes speech to text conversion 340. In one example, the captioning can be displayed on a screen of the device.

In one example, the captioning can be displayed on a second screen of a second device communicating with the device. For example, a second monitor or screen can be on a smart device. In another example, the device can be a telephone system or a playback device, and the method and system according to the present disclosure communicates with a second monitor, e.g., a smart device such as a mobile phone to present the audio assistance output to the mobile phone screen or display.

In another example, the communicating of the audio assistance output includes audio of the speech input for playing using a speaker. For example, the audio assistance output can include audio for playing using headphones or on a speaker of a device.

In another example, the user requests assistance to understand speech due to a language accent of the particular participant. Such request can take the form of a selection provided by the system. The user's lack of understanding of another participant's speech can be due to, for example, a participant's accent, a participant's speed of speaking or other speaking variation. In another example, the user's lack of understanding of another participant's speech can include attributes of the user, for example, the user can prefer a participant to speak slower. In another example, a user's lack of hearing can result in a preference for the participant to speak slower or for a different pronunciation or accent.

In another example, the method and system can include determining a match for a previously stored speech profile for a particular participant. When the speech profile does not exist, the method and system can include creating a speech profile when the previously stored speech profile does not exist.

In another example, the method and system includes identifying a particular participant based on the speech of the particular participant. In another example, the method and system can include identifying the participant based on the received communication from the participant, and only communicating the audio assistance output to the device of the user.

In another example, according to embodiments of the present disclosure, the method and system may not communicate the audio assistance output to another participant and/or not communicating the audio assistance output as a closed caption in a video stream. Thus, embodiments of the present disclosure can include generating and sending captioning and in other scenarios, not generating and sending captioning. This is in contrast to methods where closed captioning is generated and displayed as part of a video feed, and thus communicated to all participants viewing the video feed. In the present disclosure, and an advantage therein, the audio assistance output can be communicated to one or more users. The output can be derived from one or more participants. Thus, singular participants, selected by the user, can have speech analyzed and an output generated for the singular participant to be communicated to the user.

In another example, the method and system can include receiving a selection, from a user, of a mode of communication of the audio assistance output to the user. For example, a mode can include closed captioning, text to a smart device, audio to a smart device, etc.

In another example, the method and system can include receiving participant data from each of a plurality of participants in the electronic group meeting, generating a participant profile for each of the plurality of participants, analyzing speech of each of the participants of the plurality of participants, the analysis of the speech including analysis of speech patterns, identifying each of the participants based on the speech analysis, respectively, and saving the identification and the speech analysis in the participant profile for each of the plurality of participants.

In another example, the method and system can include, in response to the user using a mobile phone, sending the audio assistance output (captioning) being sent to a screen of the mobile phone, in response to the screen of the mobile phone not being available, sending the audio assistance output to another device connected to the mobile phone, and in response to the mobile phone not being available, sending the audio assistance output to another electronic device communicating with the electronic group meeting.

In another example, the communication received from the user can include a selection from the user indicating the particular participant that the user requests assistance to understand speech.

Additionally, the method and system are discussed with reference to FIG. 5, which is a functional system 300 which includes components and operations for embodiments according to the present disclosure, and is used herein for reference when describing the methods and systems of the present disclosure. Additionally, the functional system 300, according to an embodiment of the present disclosure, depicts functional operation indicative of the embodiments discussed herein.

Other Embodiments and Examples

Embodiments according to the disclosure can include turning on captioning of speech based on personal preferences of a listener, and to deliver the captions directly to the listener rather than as a single media stream, for example, over a conference call line. The captioning output can be used as captions for a speaker identified as being troublesome for a listener. A determination is made of how to deliver the caption data (captioning) to the listener in a way that is most convenient for the listener or most desired for the listener. Captions are automatically enabled for a speaker when a listener profile indicates that captions are needed for that listener. Captions can be delivered directly to the listener on the device of their choice automatically, requiring no interaction between the listener and the application. The captioning can be delivered in real-time, rather than requiring an interruption of the audio-visual stream to rewind. Thus, the present disclosure provides delivering captions to specific users via their own devices only when the listener requires such captions.

In one or more embodiments and examples according to the present disclosure, a user can be on a conference call (for instance, with no video) that involves many colleagues from various countries. A user can have trouble understanding a particular colleague when that colleague is speaking. For example, the particular colleague may have an accent where he or she is speaking in a second language or a language not their first language, in another example, the particular colleague can be speaking rapidly. For whatever the reason, the user is having a challenging time understanding the particular colleague and is may be awkward, inappropriate, time consuming, etc., to interject and ask or repeatedly ask for the colleague to repeat themselves. On the other hand, it can be concerning that valuable information from the colleague, due to this lack of understanding what is being said, may be missed. In one example, closed captioning may not be available, and/or a video feed may not be available. In another example, a similar problem is presented when listening to other audio playback or streaming, such as voicemails, audio books, and instructional audio streams. In an example where there is a video stream, closed captioning may not be available, and/or closed captioning may not be desirable for all participants or audio, that is, only the particular participants are desired to be captioned for the user or one participant of many participants.

The embodiments of the present disclosure provide one or more solutions to such problems and issues. The advantages presented by the present disclosure include methods and systems for detecting when a user is having a problem understanding another participant in a group electronic meeting. The methods and systems can provide transcribing and captioning of the particular participant instead of all dialog in a video feed, and the methods and systems can provide the captioning to the user in a selected mode, without providing the captioning to all viewers or as closed captioning on a video feed.

Disclosed is a method and system that determines when a user is having difficulty understanding another person's speaking, for instance in an electronic group meeting, and creates a voice profile to represent the characteristics of the voice or audio of the person that caused difficulty for another user. The method and system includes enabling captioning for that particular voice, in other words, audio of that particular person (and others that match that voice profile), and delivers that captioning to the user via a method that is convenient for the user in the current situation based on preferences or previous interactions. A stored voice profile can be used to enable captioning for any voices that match its characteristics in future conversations. Thereby, the methods and systems of the present disclosure include advantages such as voice-to-text subtitles/captioning solutions of particular participants to specific users. Such closed captioning can be distracting if not needed. In one example, where there is an audio only stream and a separate transmission is required of the textual information, a user may also receive the additional transmission when requested or needed by the user, thereby saving data usage and reducing distractions.

In one example, embodiments of the present disclosure could be applied in situations where multiple people in a room don't want closed captioning assistance, a method and system according to the present disclosure provides assistance only to the person who needs it. Thus, the methods and systems according to the present disclosure, provide a more discreet way to deliver closed captioning to a user than on-screen subtitles.

In one embodiment according to the present disclosure, an audio conversation, such as a telephone conference call, or voicemail, audiobooks, or listening to a television stream in a group, etc., wherein a user is listening to an audio stream (either live or recorded), a method and system can set up a profile by default or customized by the user to determine the a desired location for captioning, and considering both the listening devices and related peripherals of the user. In one example, if a user is speaking on a mobile phone with no headphones and there is a computer, the user will be connected by a wireless connection, and captioning can go to the computer screen. In another example, if a user is speaking on a mobile phone with headphones or using speakerphone, captioning can go to a phone screen (via an app, text message, etc.). In another example, if the user is speaking on a mobile phone and the phone screen is not available (for example, the phone is stored in a pocket, or otherwise unavailable for viewing), the system can send captioning to a connected device such as a smart watch, or other smart device. In another example, if the user is using a conference line that is integrated into the system, then captioning can be sent to another device (such as the user's cell phone, or computer, etc.). In another example, if the user is using an unidentified line (for example, a hotel room phone line, or a telephone line in a public place, etc.), the user can connect to a server URL or create a three-way call with another device and use the device screen or display. During an audio/video stream, the system receives an indicator or a trigger that detects that the user is struggling to understand the speech of a particular individual. The indicator can include the user manually turning on a closed captioning, accepting an input (e.g., certain keystrokes on the phone or within the phone app) indicating difficulty. In another example, specific words/phrases/sentences said by the user in a conversation (e.g., "Can you please repeat that?", "I'm not understanding.", etc.) can be used as an indicator or trigger. In another example, an indicator can include a sentiment analysis can detect the user is struggling. In another example, in a recorded stream, an indicator can include the user jumps back multiple times to listen to the same segment.

In response to the system receiving an indicator or trigger during the stream, the system identifies a voice that matches a previously stored speech profile, or if a profile does not exist, the system creates a profile for the voice that the user was struggling to understand. As there are predictable patterns to accents/dialects based on vowel and consonant sounds and mouth shapes that a speaker uses in their native language, the method and system can create participant profiles to categorize the speech (e.g., a particular accent, dialect, native language, cadence, etc.) of a voice.

The system provides real-time assistance when the initial voice or another voice matching its profile speaks for the rest of the conversation, such as the system can provide captioning for the recognized voice and display it on the screen or in a text/notification as determined per preference above. In one example, in a pre-recorded audio stream, the voice could be slowed down when replayed. In another example, when more than one trigger occurs (that is, two different voices are indicated), the displayed text could identify the different voices, e.g., through color or labels.

In another example, the system can automatically provide real-time assistance for a previously identified voice and any others that share a threshold of characteristics with the participant's stored profile(s).

In another example, gaze tracking or using explicit feedback can be used to detect when a user is no longer having difficulty, in response to this determination, a system can reduce or stop the assistance, i.e., the captioning. In another example, a user could add clarifying comments or corrections to a transcription so that the system can improve in the future, thereby providing a learning mechanism for the system.

In another example, systems and methods according to the present disclosure, can include assisting in learning a language by incrementally decreasing assistance to a user, to test their ability to understand from speakers in a language of the user's choice.

In another example, the detecting of the user having difficulty can include detecting an indicator of the user having the difficulty, and in response to detecting the indicator, initiating the identification of the speech of the particular participant. In another example, the method can further include detecting an action by the user, at least in part, as the indicator.

In another example, the action by the user can include a request for a particular participant to repeat or explain previously recited speech.

In another example, the detecting of the user having difficulty includes detecting an indicator of the user having the difficulty, and in response to detecting the indicator, initiating the identification of the speech of the particular participant; and the indicator can include a communication from the user indicating that the user requests assistance.

In another example, the method can include determining a similar previously stored speech profile for a first particular participant based on criteria including a language accent; and initiating the audio assistance output in response to the first particular participant having a similar profile to the similar previously stored speech profile.

Another Embodiment and Examples

Figure 3:
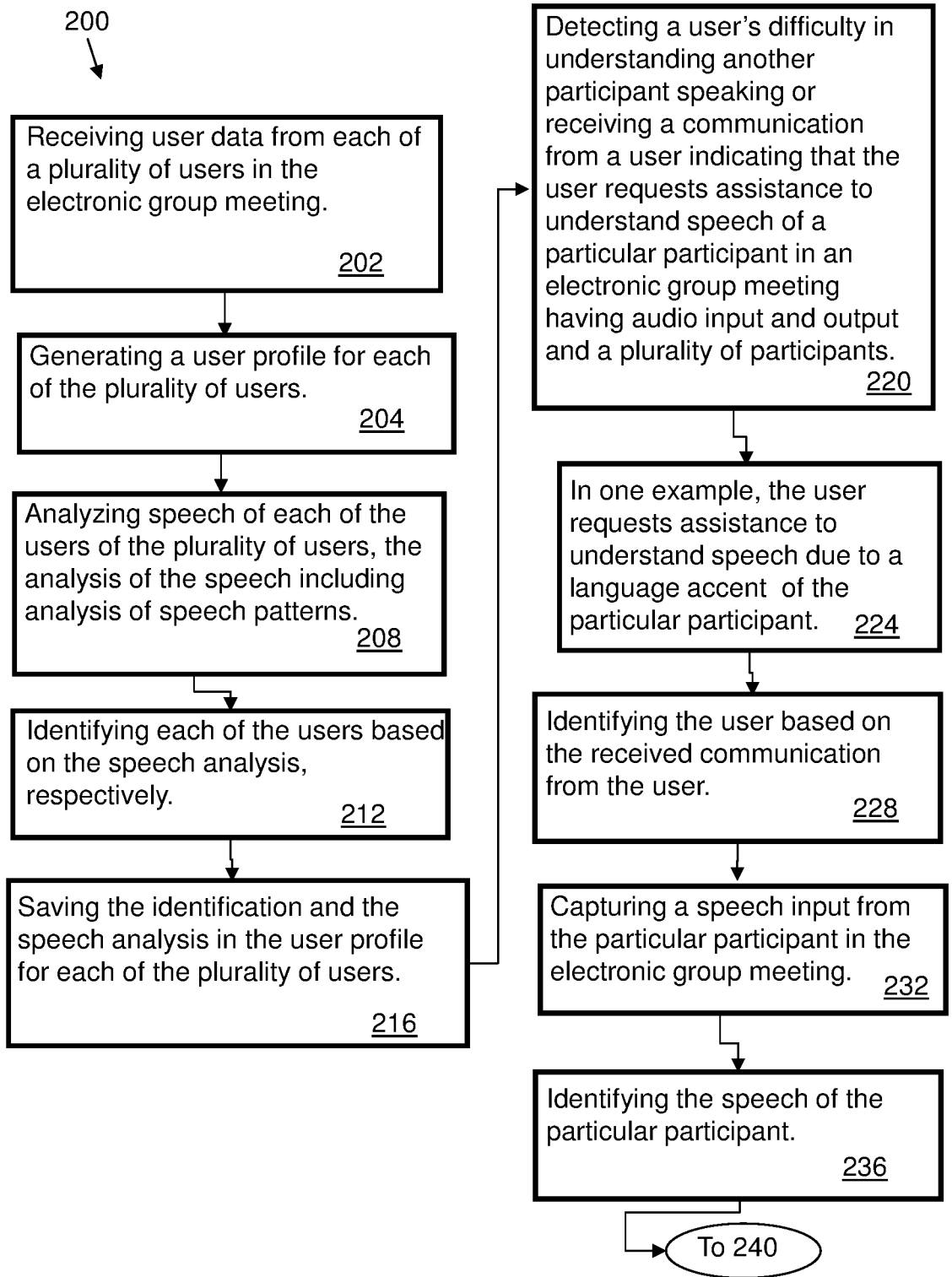
FIG. 3 is a flow chart illustrating another method, implemented using the system shown in FIG. 1, for personalizing captioning in response to a user indicating a difficulty in understanding another participant speaking, according to an embodiment of the present disclosure.
Figure 4:
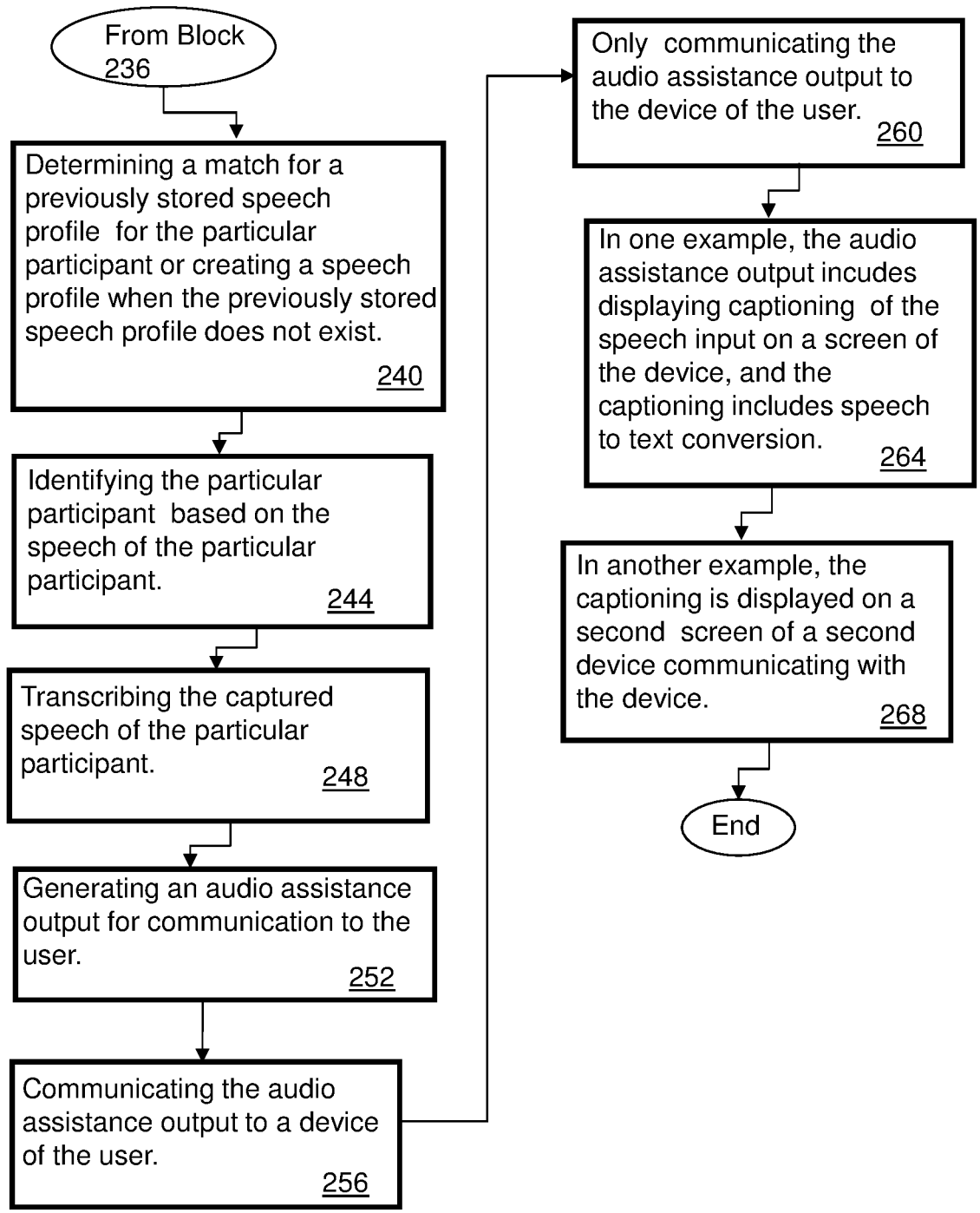
FIG. 4 is a flow chart continuing from the flow chart shown in FIG. 3 depicting a continuation of the method shown in FIG. 3, according to an embodiment of the invention.

Referring to FIGS. 1, 3 and 4, in one embodiment according to the present disclosure, a computer-implemented method 200 for personalizing captioning in response to a user indicating a difficulty in understanding another participant speaking. The method 200 includes receiving participant data from each of a plurality of participants in the electronic group meeting, as in block 202. The participant data can include populating and maintaining a historical database of participant profiles. In one example, a historical database can include database 76 which can be populated with historical data of participant profiles. For example, user names and associated speech characteristics can be stored.

Operational blocks of the method 200 shown in FIGS. 3 and 4 may be similar to operational blocks shown in FIG. 2. The method shown in FIGS. 3 and 4 is intended as another example embodiment which can include aspects/operations shown and discussed previously in the present disclosure.

The method 200 can include generating a participant profile for each of the plurality of users, as in block 204.

The method 200 includes analyzing speech of each of the participants of the plurality of participants, the analysis of the speech including analysis of speech patterns, as in block 208.

The method 200 includes identifying each of the participants based on the speech analysis, respectively, as in block 212.

The method 200 includes saving the identification and the speech analysis in the participant profile for each of the plurality of participants, as in block 216.

The method 200 includes detecting a user's difficulty in understanding another participant speaking or receiving a communication from a user indicating that the user requests assistance to understand speech of a particular participant in an electronic group meeting having audio input and output and a plurality of participants, wherein the plurality of participants includes the user, as in block 220. For example, a communication can also be referred to as a trigger prompt or an indicator message. Such requests for assistance can indicate that a user is struggling with understanding a particular participant.

The method 200 includes, in one example, the user requesting assistance to understand speech due to a language accent of the particular participant, as in block 224.

The method includes identifying the participant based on the received communication from the participant, as in block 228.

The method 200 includes capturing a speech input from the particular participant in the electronic group meeting, as in block 232.

The method 200 includes identifying the speech of the particular participant, as in block 236.

The method includes determining a match for a previously stored speech profile for the particular participant or creating a speech profile when the previously stored speech profile does not exist, as in block 240.

The method includes identifying the particular participant based on the speech of the particular participant, as in block 244.

The method includes transcribing the captured speech of the particular participant, as in block 248.

The method includes generating an audio assistance output for communication to the user, as in block 252.

The method includes communicating the audio assistance output to a device of the user, as in block 256. In one example, the method can only communicate the audio assistance output to the device of the user, that is, sending the communication to no other users or participants, as in block 260.

In a further example, the audio assistance output includes displaying captioning of the speech input on a screen of the device, and the captioning includes speech to text conversion, as in block 264.

In another example, the method 200 includes, in response to the screen of the mobile phone not being available, sending the audio assistance output to another device connected to the mobile phone, as in block 268. In another example, in response to the mobile phone not being available, sending the audio assistance output to another electronic device communicating with the electronic group meeting.

Further Embodiments and Examples

Account data, for instance, including profile data related to a user, and any data, personal or otherwise, can be collected and stored, for example, in the control system 70. It is understood that such data collection is done with the knowledge and consent of a user, and stored to preserve privacy, which is discussed in more detail below. Such data can include personal data, and data regarding personal items.

In one example a user can register 82 have an account 81 with a user profile 83 on a control system 70, which is discussed in more detail below. For example, data can be collected using techniques as discussed above, for example, using cameras, and data can be uploaded to a user profile by the user.

More Examples and Embodiments

Figure 6:
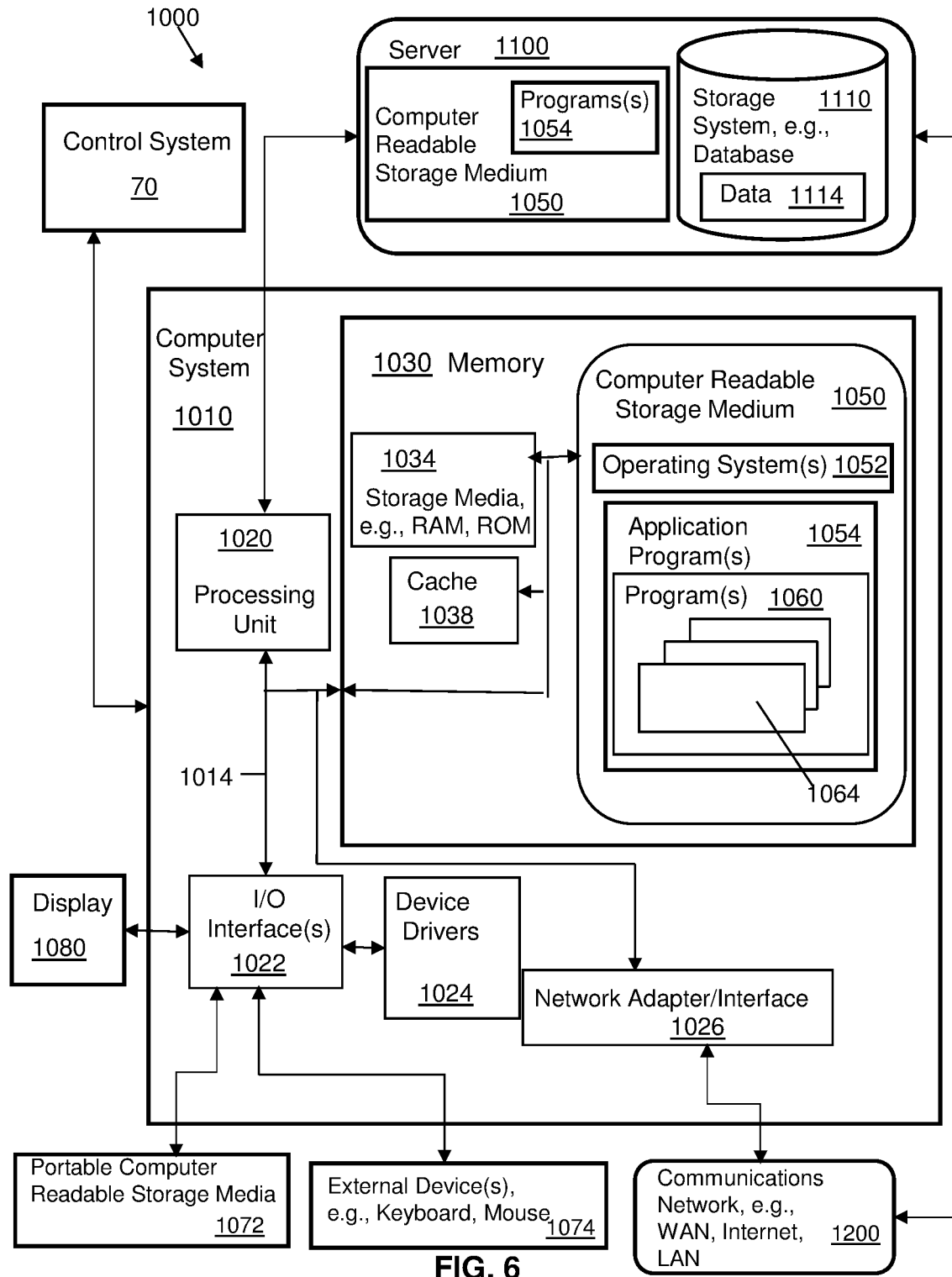
FIG. 6 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 6). In another example, the computer 72 can be part of a control system 70 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the mobile device can include a computer 30 having a processor 32 and a storage medium 34 which stores an application 40. The application can incorporate program instructions for executing the features of the present disclosure using the processor 32. In another example, the mobile device application or computer software can have program instructions executable for a front end of a software application incorporating the features of the method of the present disclosure in program instructions, while a back end program or programs 74, of the software application, stored on the computer 72 of the control system 70 communicates with the mobile device computer and executes other features of the method. The control system 70 and the mobile device or computer 30 can communicate using a communications network 50, for example, the Internet.

Thereby, the method 100 according to an embodiment of the present disclosure, can be incorporated in one or more computer programs or an application 40 stored on an electronic storage medium 34, and executable by the processor 32, as part of the computer on the mobile device. For example, a mobile device can communicate with the control system 70, and in another example, a device such as a video feed device can communicate directly with the control system 70. Other users (not shown) may have similar mobile devices which communicate with the control system similarly. The application can be stored, all or in part, on a computer or a computer in a mobile device and at a control system communicating with the mobile device, for example, using the communications network 50, such as the Internet. It is envisioned that the application can access all or part of program instructions to implement the method of the present disclosure. The program or application can communicate with a remote computer system via a communications network 50 (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 6 and described in more detail in regards thereto referring to one or more computer systems 1010.

Thus, in one example, a control system 70 is in communication with the computer 30, and the computer can include the application or software 40. The computer 30, or a computer in a mobile device (not shown) communicates with the control system 70 using the communications network 50.

In another example, the control system 70 can have a front-end computer belonging to one or more users, and a back-end computer embodied as the control system.

Also, referring to FIG. 1, a device can include a computer 30, computer readable storage medium 34, and operating systems, and/or programs, and/or a software application 40, which can include program instructions executable using a processor 32. These features are shown herein in FIG. 1, and also in an embodiment of a computer system shown in FIG. 6 referring to one or more computer systems 1010, which may include one or more generic computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 70, the device(s) 25, in one example the devices which can belong to one or more users, and can be in communication with the control system 70 via the communications network 50. In the embodiment of the control system shown in FIG. 1, the control system 70 includes a computer 72 having a database 76 and one or more programs 74 stored on a computer readable storage medium 73. In the embodiment of the disclosure shown in FIG. 1, the devices 25 communicate with the control system 70 and the one or more programs 74 stored on a computer readable storage medium 73. The control system includes the computer 72 having a processor 75, which also has access to the database 76.

The control system 70 can include a storage medium 80 for maintaining a registration 82 of users and their devices for analysis of the audio input. Such registration can include user profiles 83, which can include user data supplied by the users in reference to registering and setting-up an account. In an embodiment, the method and system which incorporates the present disclosure includes the control system (generally referred to as the back-end) in combination and cooperation with a front end of the method and system, which can be the application 40. In one example, the application 40 is stored on a device, for example, a computer on location 30, and can access data and additional programs at a back end of the application, e.g., control system 70.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device and computer 30 having the application 40. The application 40 is stored on the computer 30 and can access data and additional programs at the back end of the application, for example, in the program(s) 74 stored in the control system 70.

The program(s) 74 can include, all or in part, a series of executable steps for implementing the method of the present disclosure. A program, incorporating the present method, can be all or in part stored in the computer readable storage medium on the control system or, in all or in part, on a computer 30 or device. It is envisioned that the control system 70 can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles 83, however, the method can include multiple profiles, users, registrations, etc. It is envisioned that a plurality of users or a group of users can register and provide profiles using the control system for use according to the method and system of the present disclosure.

Still Further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks another FIG. A method shown in one FIG. may be another example embodiment which can include aspects/operations shown in another FIG. and discussed previously.

Additional Embodiments and Examples

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

Other Additional Embodiments and Examples

In one example, Artificial Intelligence (AI) can be used, all or in part, for a learning model for analyzing speech of one or more participants of a plurality of participants.

In another example, the control system 70 can be all or part of an Artificial Intelligence (AI) system. For example, the control system can be one or more components of an AI system.

It is also understood that the method 100 according to an embodiment of the present disclosure, can be incorporated into (Artificial Intelligence) AI devices, which can communicate with respective AI systems, and respective AI system platforms. Thereby, such programs or an application incorporating the method of the present disclosure, as discussed above, can be part of an AI system. In one embodiment according to the present invention, it is envisioned that the control system can communicate with an AI system, or in another example can be part of an AI system. The control system can also represent a software application having a front-end user part and a back-end part providing functionality, which can in one or more examples, interact with, encompass, or be part of larger systems, such as an AI system. In one example, an AI device can be associated with an AI system, which can be all or in part, a control system and/or a content delivery system, and be remote from an AI device. Such an AI system can be represented by one or more servers storing programs on computer readable medium which can communicate with one or more AI devices. The AI system can communicate with the control system, and in one or more embodiments, the control system can be all or part of the AI system or vice versa.

It is understood that as discussed herein, a download or downloadable data can be initiated using a voice command or using a mouse, touch screen, etc. In such examples a mobile device can be user initiated, or an AI device can be used with consent and permission of users. Other examples of AI devices include devices which include a microphone, speaker, and can access a cellular network or mobile network, a communications network, or the Internet, for example, a vehicle having a computer and having cellular or satellite communications, or in another example, IoT (Internet of Things) devices, such as appliances, having cellular network or Internet access.

Further Discussion Regarding Examples and Embodiments

It is understood that a set or group is a collection of distinct objects or elements. The objects or elements that make up a set or group can be anything, for example, numbers, letters of the alphabet, other sets, a number of people or users, and so on. It is further understood that a set or group can be one element, for example, one thing or a number, in other words, a set of one element, for example, one or more users or people or participants.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Referring to FIG. 6, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 70, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embodiment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 7:
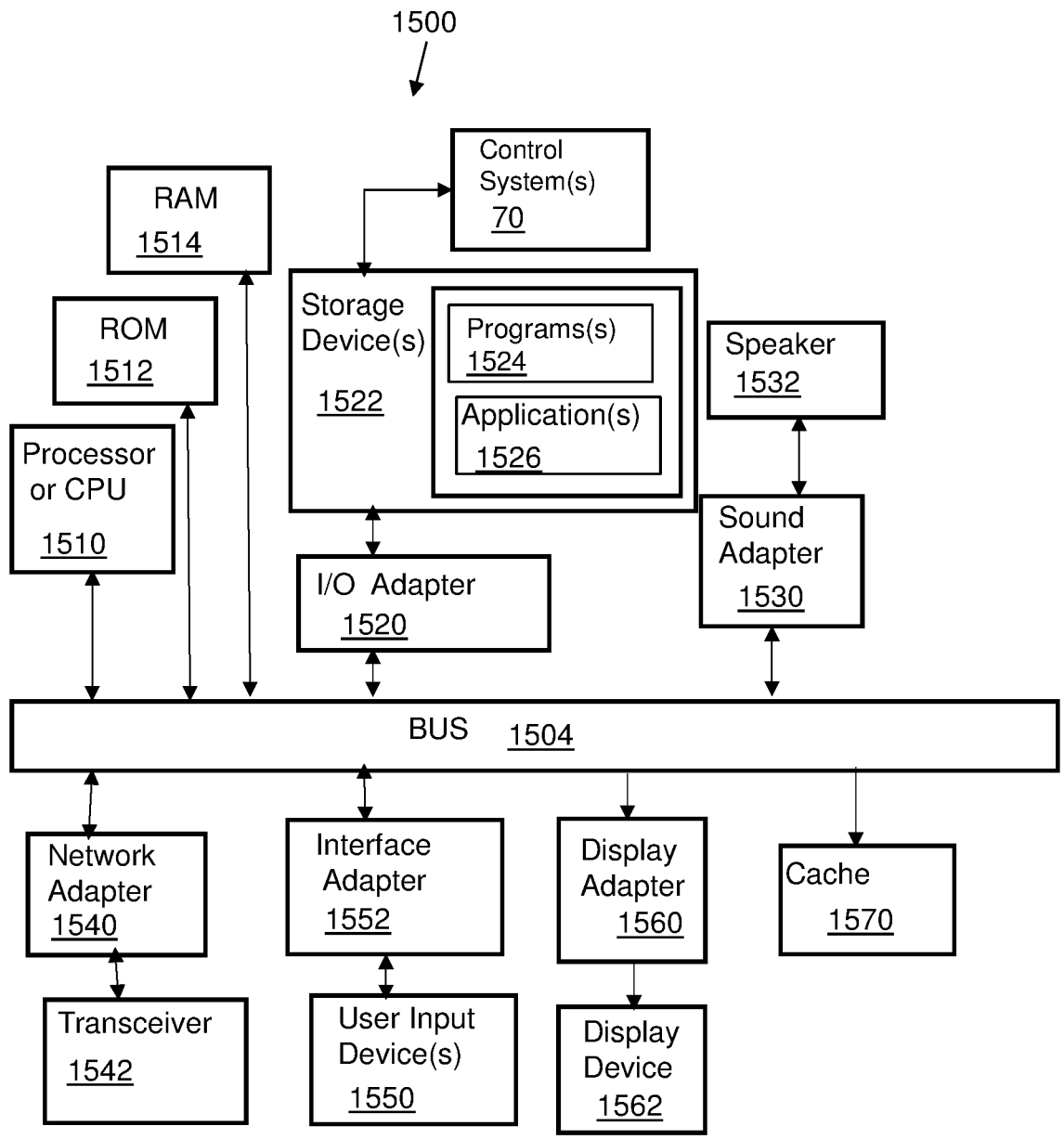
FIG. 7 is a schematic block diagram of a system depicting system components interconnected using a bus. The components for use, in all or in part, with the embodiments of the present disclosure, in accordance with one or more embodiments of the present disclosure.

Referring to FIG. 7, an example system 1500 for use with the embodiments of the present disclosure is depicted. The system 1500 includes a plurality of components and elements connected via a system bus 1504 (also referred to as a bus). At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure. The storage device can communicate with the control system 70 which has various functions as described in the present disclosure.

A speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

One or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additional Aspects and Examples

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
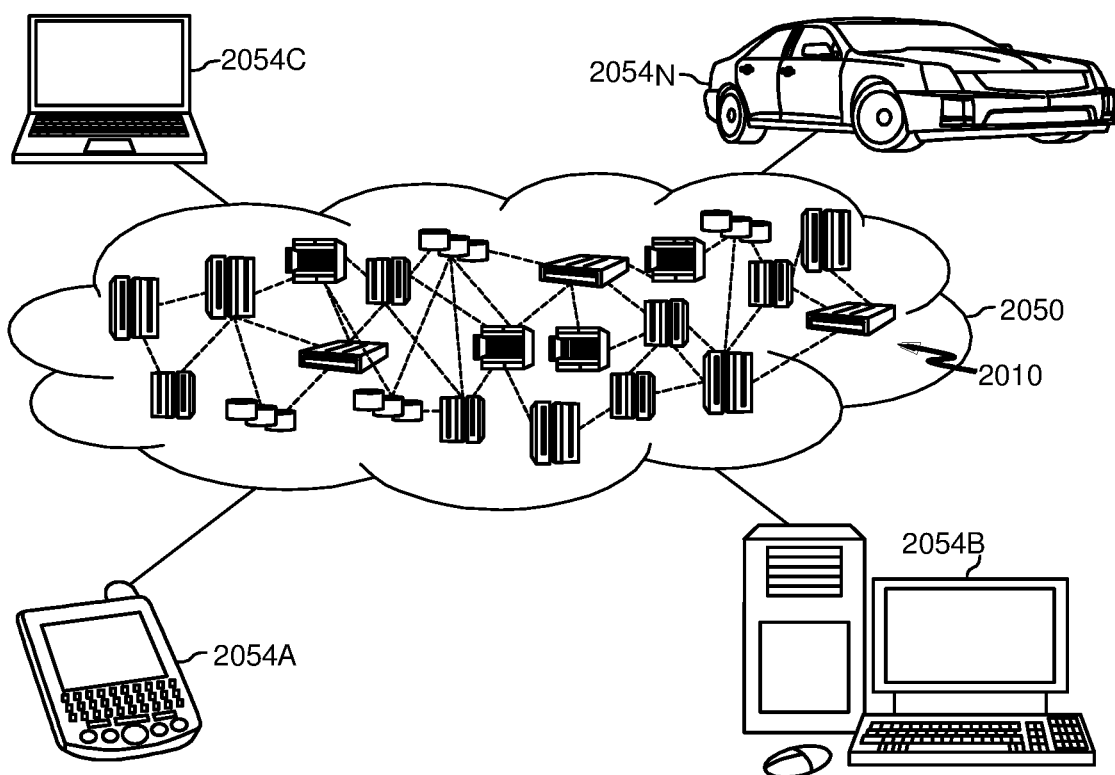
FIG. 8 is a block diagram depicting a cloud computing environment according to an embodiment of the present invention.

Referring now to FIG. 8, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 8 are intended to be illustrative only and that computing nodes 2010 and cloud computing environment 2050 can communicate with any type of computerized device over any type of network and/or network addressable connection (e.g., using a web browser).

Figure 9:
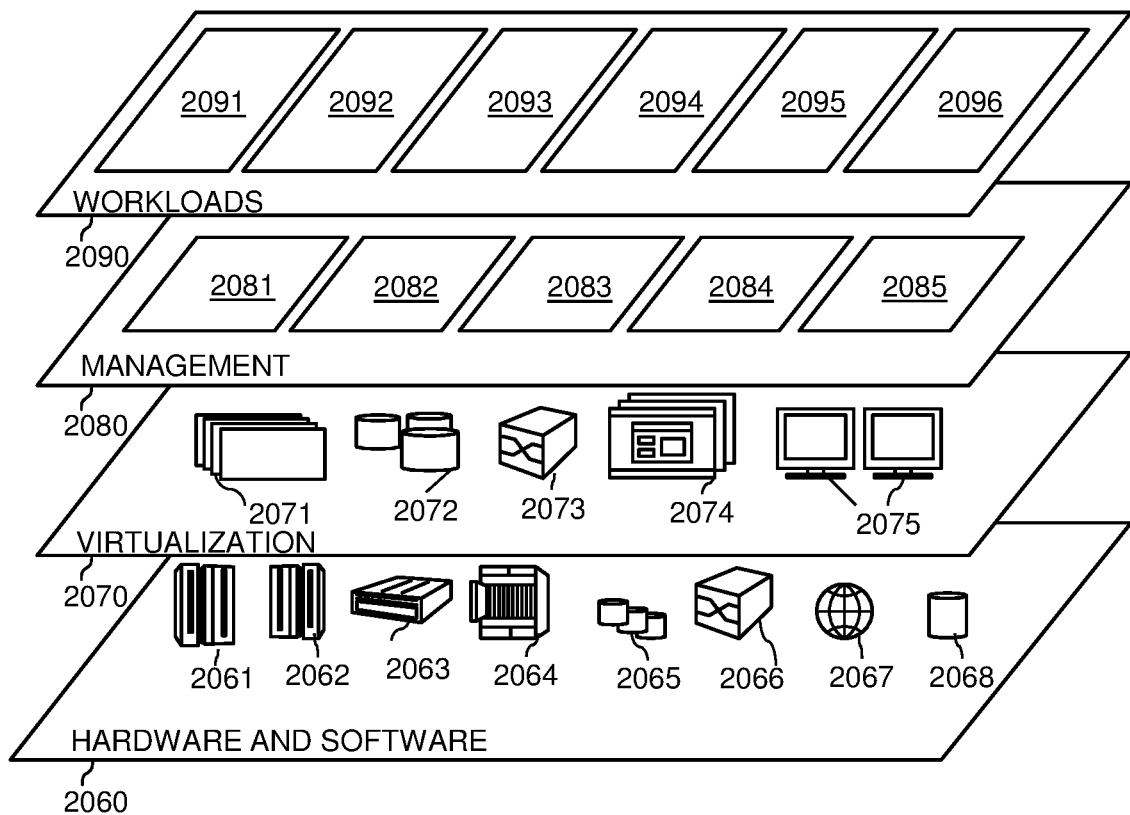
FIG. 9 is a block diagram depicting abstraction model layers according to an embodiment of the present invention.

Referring now to FIG. 9, a set of functional abstraction layers provided by cloud computing environment 2050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and transcribing and captioning a person's speech and/or real-time speaking and presenting to a user 2096.

What is claimed is:

1. A computer-implemented method for personalizing captioning in response to detecting a user's difficulty in understanding another participant speaking in a live or recorded electronic meeting, comprising:
    detecting, using a computer, a user having a difficulty in understanding speech of a particular participant;
    identifying, using the computer, the speech of the particular participant, in response to detecting the user having the difficulty in understanding the speech;
    capturing, using the computer, a speech input from the particular participant;
    transcribing the captured speech of the particular participant;
    generating an audio assistance output for communication to the user; and
    communicating the audio assistance output to a device of the user;
    wherein the detecting of the user having difficulty includes detecting an indicator of the user having the difficulty, and in response to detecting the indicator, initiating the identification of the speech of the particular participant, and
    the indicator including a communication from the user indicating that the user requests assistance; and the method further comprising;
    not communicating the audio assistance output to another participant and/or not communicating the audio assistance output as a closed caption in a video stream.

2. The method of claim 1, wherein the audio assistance output incudes displaying captioning of the speech input on a screen of the device, and the captioning includes speech to text conversion.

3. The method of claim 2, wherein the captioning is displayed on a screen of the device.

4. The method of claim 2, wherein the captioning is displayed on a second screen of a second device communicating with the device.

5. The method of claim 1, wherein the communicating of the audio assistance output includes audio of the speech input for playing using a speaker.

6. The method of claim 1, wherein the detecting of the user having difficulty includes detecting an indicator of the user having the difficulty, and in response to detecting the indicator, initiating the identification of the speech of the particular participant.

7. The method of claim 1, wherein the detecting of the user having difficulty includes detecting an indicator of the user having the difficulty, and in response to detecting the indicator, initiating the identification of the speech of the particular participant; and the method further comprising:
  detecting an action by the user, at least in part, as the indicator.

8. The method of claim 7, wherein the action by the user includes a request for a particular participant to repeat or explain previously recited speech.

9. The method of claim 1, further comprising:
  determining a match for a previously stored speech profile for the particular participant or creating a speech profile when the previously stored speech profile does not exist.

10. The method of claim 1, further comprising:
  identifying the particular participant based on the speech of the particular participant.

11. The method of claim 1, further comprising:
  identifying the user based on the received communication from the user; and
  only communicating the audio assistance output to the device of the user.

12. The method of claim 1, further comprising:
  receiving a selection, from the user, of a mode of communication of the audio assistance output to the user.

13. The method of claim 1, further comprising:
  determining a similar previously stored speech profile for a first particular participant based on criteria including a language accent; and
  initiating the audio assistance output in response to the first particular participant having a similar profile to the similar previously stored speech profile.

14. The method of claim 1, further comprising:
  receiving participant data from each of a plurality of participants in the electronic group meeting;
  generating a participant profile for each of the plurality of participants;
  analyzing speech of each of the participants of the plurality of participants, the analysis of the speech including analysis of speech patterns;
  identifying each of the participants based on the speech analysis, respectively; and
  saving the identification and the speech analysis in the participant profile for each of the plurality of participants.

15. The method of claim 1, further comprising:
  in response to the user using a mobile phone, the audio assistance output being sent to a screen of the mobile phone;
  in response to the screen of the mobile phone not being available, sending the audio assistance output to another device connected to the mobile phone; and
  in response to the mobile phone not being available, sending the audio assistance output to another electronic device communicating with the electronic group meeting.

16. The method of claim 1, wherein the communication received from the user includes a selection from the user indicating the particular participant that the user requests assistance to understand speech.

17. A system using a computer for personalizing captioning in response to detecting a user's difficulty in understanding another participant speaking in a live or recorded electronic meeting, which comprises:
  a computer system comprising; a computer processor, a computer-readable storage medium, and program instructions stored on the computer-readable storage medium being executable by the processor, to cause the computer system to perform the following functions to;
  detect, using a computer, a user having a difficulty in understanding speech of a particular participant;
  identify, using the computer, the speech of the particular participant, in response to detecting the user having the difficulty in understanding the speech;
  capture, using the computer, a speech input from the particular participant;
  transcribe the captured speech of the particular participant;
  generate an audio assistance output for communication to the user; and
  communicate the audio assistance output to a device of the user;
  wherein the detecting of the user having difficulty includes detecting an indicator of the user having the difficulty, and in response to detecting the indicator, initiating the identification of the speech of the particular participant, and
  the indicator including a communication from the user indicating that the user requests assistance; and the method further comprising;
  not communicating the audio assistance output to another participant and/or not communicating the audio assistance output as a closed caption in a video stream.

18. A computer program product for personalizing captioning in response to detecting a user's difficulty in understanding another participant speaking in a live or recorded electronic meeting, the computer program product comprising a computer readable storage medium having program instructions embodied therewith, the program instructions executable by a computer to cause the computer to perform functions, by the computer, comprising the functions to:
  detect, using a computer, a user having a difficulty in understanding speech of a particular participant;
  identify, using the computer, the speech of the particular participant, in response to detecting the user having the difficulty in understanding the speech;
  capture, using the computer, a speech input from the particular participant;
  transcribe the captured speech of the particular participant;
  generate an audio assistance output for communication to the user; and
  communicate the audio assistance output to a device of the user;
  wherein the detecting of the user having difficulty includes detecting an indicator of the user having the difficulty, and in response to detecting the indicator, initiating the identification of the speech of the particular participant, and
  the indicator including a communication from the user indicating that the user requests assistance; and the method further comprising;
  not communicating the audio assistance output to another participant and/or not communicating the audio assistance output as a closed caption in a video stream.

19. A computer-implemented method for personalizing captioning in response to detecting a user's difficulty in understanding another participant speaking in a live or recorded electronic meeting, comprising:
- detecting, using a computer, a user having a difficulty in understanding speech of a particular participant;
- identifying, using the computer, the speech of the particular participant, in response to detecting the user having the difficulty in understanding the speech;
- capturing, using the computer, a speech input from the particular participant;
- transcribing the captured speech of the particular participant;
- generating an audio assistance output for communication to the user; and
- communicating the audio assistance output to a device of the user;
- determining a similar previously stored speech profile for a first particular participant based on criteria including a language accent; and
- initiating the audio assistance output in response to the first particular participant having a similar profile to the similar previously stored speech profile.

20. A computer-implemented method for personalizing captioning in response to detecting a user's difficulty in understanding another participant speaking in a live or recorded electronic meeting, comprising:
- detecting, using a computer, a user having a difficulty in understanding speech of a particular participant;
- identifying, using the computer, the speech of the particular participant, in response to detecting the user having the difficulty in understanding the speech;
- capturing, using the computer, a speech input from the particular participant;
- transcribing the captured speech of the particular participant;
- generating an audio assistance output for communication to the user; and
- communicating the audio assistance output to a device of the user;
- receiving participant data from each of a plurality of participants in the electronic group meeting;
- generating a participant profile for each of the plurality of participants;
- analyzing speech of each of the participants of the plurality of participants, the analysis of the speech including analysis of speech patterns;
- identifying each of the participants based on the speech analysis, respectively; and
- saving the identification and the speech analysis in the participant profile for each of the plurality of participants.

21. A computer-implemented method for personalizing captioning in response to detecting a user's difficulty in understanding another participant speaking in a live or recorded electronic meeting, comprising:
- detecting, using a computer, a user having a difficulty in understanding speech of a particular participant;
- identifying, using the computer, the speech of the particular participant, in response to detecting the user having the difficulty in understanding the speech;
- capturing, using the computer, a speech input from the particular participant;
- transcribing the captured speech of the particular participant;
- generating an audio assistance output for communication to the user; and
- communicating the audio assistance output to a device of the user;
- in response to the user using a mobile phone, the audio assistance output being sent to a screen of the mobile phone;
- in response to the screen of the mobile phone not being available, sending the audio assistance output to another device connected to the mobile phone; and
- in response to the mobile phone not being available, sending the audio assistance output to another electronic device communicating with the electronic group meeting.

* * * * *